Figure 1A:
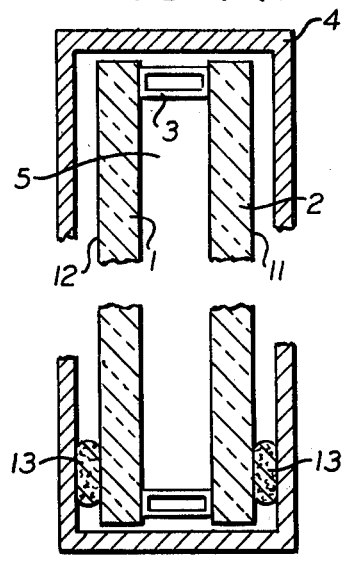

United States Patent [19]

Kiefer

[11] 4,113,904

[45] * Sep. 12, 1978

[54] FIRE RESISTANT WINDOWS

[75] Inventor: Werner Kiefer, Mainz, Germany

[73] Assignee: Jenaer Glaswerk Schott & Gen., Mainz, Germany

[*] Notice: The portion of the term of this patent subsequent to Oct. 5, 1993, has been disclaimed.

[21] Appl. No.: 637,424

[22] Filed: Dec. 3, 1975

[30] Foreign Application Priority Data

Dec. 3, 1974 [DE] Fed. Rep. of Germany ....... 2456991

[51] Int. Cl.² .......................... E06B 3/24; B32B 17/00
[52] U.S. Cl. ......................................... 428/34; 52/171; 106/54; 156/99; 156/109; 428/410; 428/426; 428/920
[58] Field of Search .......... 428/34, 920, 921, 426–428, 428/410; 156/99, 109; 52/171; 106/54, 47 R; 65/33

[56] References Cited

U.S. PATENT DOCUMENTS

| | | | |
|---|---|---|---|
| 3,251,726 | 5/1966 | Adoque | 428/410 |
| 3,537,944 | 11/1970 | Grubb et al. | 428/34 |
| 3,652,370 | 3/1972 | Motai | 428/427 |
| 3,653,862 | 4/1972 | Lynch | 428/428 |
| 3,778,335 | 12/1973 | Boyd | 428/410 |
| 3,779,856 | 12/1973 | Pirooz | 428/410 |
| 3,931,438 | 1/1976 | Beall et al. | 428/212 |
| 3,935,351 | 1/1976 | Franz | 428/34 |
| 3,942,992 | 3/1976 | Flannery | 106/54 |
| 3,984,252 | 10/1976 | Kiefer | 106/54 |

FOREIGN PATENT DOCUMENTS 2,220,523  11/1972  Fed. Rep. of Germany.

Primary Examiner—George F. Lesmes
Assistant Examiner—P. Thibodeau
Attorney, Agent, or Firm—Burgess, Dinklage & Sprung

[57] ABSTRACT

A window composed of a frame having at least two, parallel disposed, spaced glass panes. At least one of the panes is composed of fire-resistant glass. The fire resistant pane can be a borosilicate or alumino silicate glass having a compressive prestress in the peripheral edge portion thereof, and for which the product of thermal expansion $\alpha$ and the elastic modulus E is 1–5 kp × cm$^{-2}$ × °C$^{-1}$.

29 Claims, 3 Drawing Figures

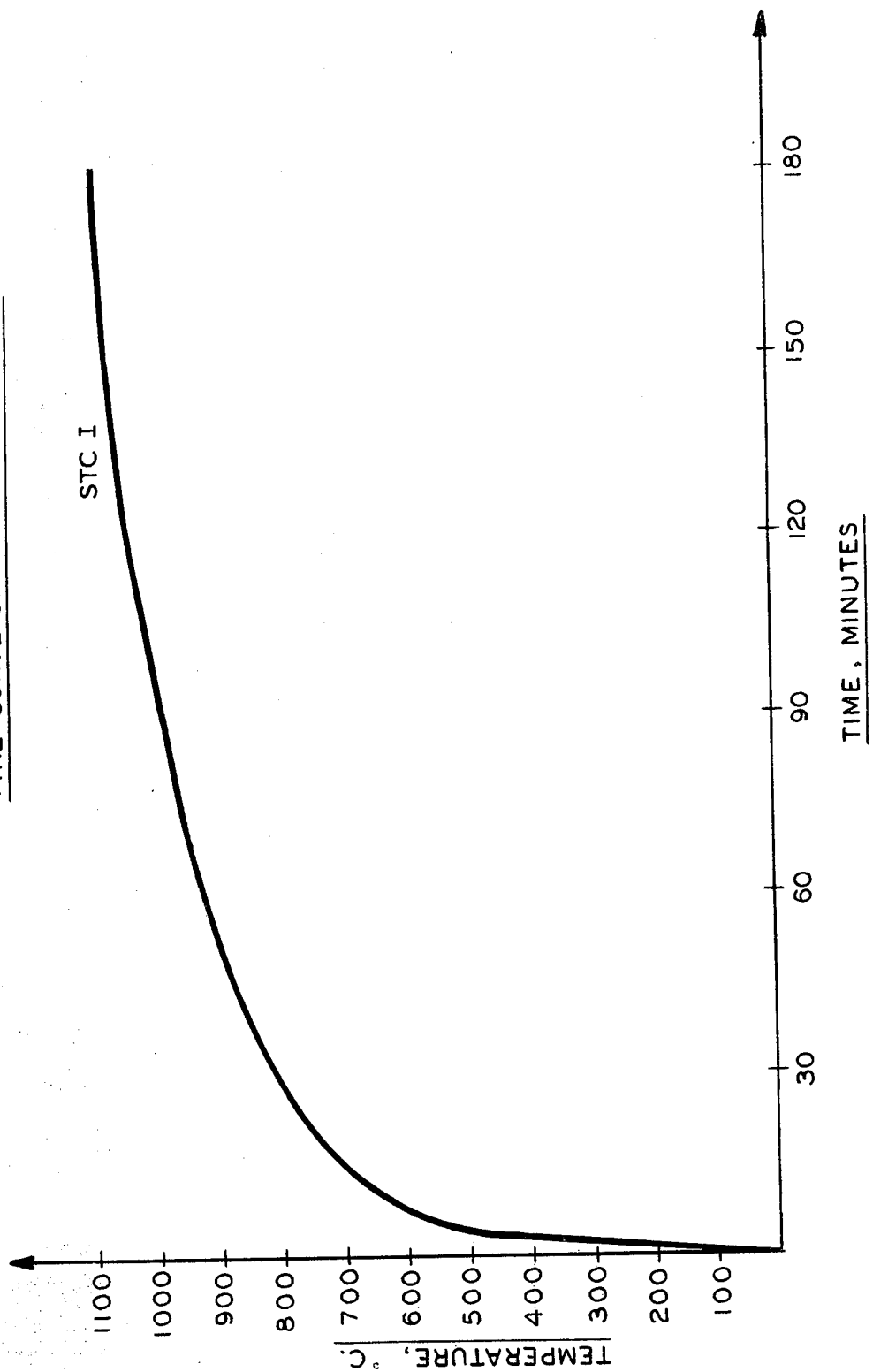

FIRE RESISTANT WINDOWS

BACKGROUND

The invention relates to a fire-resistive glazing having two or more preferably transparent sheets of glass, at least one of which is a glass which will not shatter upon an abrupt temperature rise due to exposure to fire.

A large variety of double glazings and multiple glazings are known which contain two or more panes of glass arranged in parallel. Such multiple glazing serves primarily for thermal and sound insulation purposes. However, there is as yet no insulating multiple glazing which provides fire protection in the sense that shattering will not occur when it is exposed to fire.

Multiple glazings are known which do offer fire protection properties which are achieved by using wire glass in one of the panes. Such wire glass panes shatter like any normal window glass in the event of a fire, but the fragments are so held together by the wire fabric contained in the pane that to some extent they prevent the passage of smoke and flame through the shattered window.

In addition to the fact that wire glass shatters in a fire, it has the additional disadvantage that, in any case it does not possess complete transparency and consequently its use is often unacceptable for esthetic and architectural reasons. Its use is limited largely to industrial structures.

Multiple glazing has become known through German "Offenlegungsschrift" No. 2,220,523, which contains one pane made of glass ceramic as the fire-resistive pane. Such assemblies are usually too expensive for use in the glazing of windows in building construction, and furthermore the production of completely transparent ceramic window glass is possible only with difficulty. Since windowpanes made of glass ceramic are not glass panes in the strict sense of the word, they are not to be understood as glass windowpanes in the meaning of the invention.

THE INVENTION

The object of the present invention is a fire-resistive, preferably transparent multiple glazing having thermal and sound insulating properties, which in the event of the outbreak of a fire will provide a complete closure, so that neither smoke nor flame will be able to pass through it.

This object is achieved by a multiple glazing consisting of two or more preferably transparent panes held in a rim, and it is characterized in that at least one of the panes is a glass pane which will not shatter in the event of an abrupt temperature rise due to a fire.

The requirements which must be fulfilled by such a glazing are laid down in German Standard DIN 4102, 1970 edition, sheet 2, section 5. The standard prescribes certain temperature rise curves (standard temperature curves) which a structural component must withstand for certain periods of time under certain installation conditions in order to qualify as fire-resistive. The expression, "fire-resistive assemblies and windowpanes which do not shatter upon exposure to an abrupt temperature rise due to a fire," as used herein, is to be understood as meaning assemblies and windowpanes which satisfy the requirements of DIN 4102, Sheet 2.

The requirement that a windowpane must not shatter in a fire is satisfied only by special window glasses whose surfaces are additionally hardened entirely or in part by a special process. Suitable hardening processes are quenching, chemical hardening by ion exchange, and hardening by partial devitrification. It is especially advantageous if the glass windowpane serving as a fire-resistive windowpane is placed under additional compressive tension by partial hardening of its marginal areas.

Special fire-resistive windowpanes and methods of manufacturing same are described in German patent application DT-OS No. 2,313,442; and U.S. Ser. No. 505,895, filed Sept. 13, 1975, which issued as U.S. Pat. No. 3,984,252, and now U.S. Pat. No. 3,984,252 and Ser. No. 577,481, filed May 14, 1975, replaced by continuation Ser. No. 845,987, filed Oct. 27, 1977 and now abandoned. Those glasses are suitable for the instant inventions and the U.S. applications are incorporated herein by reference.

Accordingly, special glasses for fire-resistive windows include those in which the product of the thermal expansion coefficient ($\alpha$) times the modulus of elasticity (E) amounts to approximately $1 - 5 \text{ kp} \times \text{cm}^{-2} \times {}^\circ\text{C}^{-1}$. Borosilicate and aluminosilicate glasses are used preferentially. The borosilicate glasses also include those of the Duran type which, in the form of thermally surface-hardened windowpanes, can also be suitable as fire-resistive windowpanes. Those glass compositions within the above-described groups are also especially suitable which can be chemically hardened or which have a tendency towards surface devitrification.

Window glass which has a strong tendency towards surface devitrification not only offers the possibility of hardening, by surface devitrification, the marginal areas which are covered by the sash, thus creating an additional compressive tension as mentioned above, but also has the decided advantage that, in the event of a fire, it will form a devitrified layer at least 5 to 10 micrometers thick over its entire surface while it is being heated to its softening temperature, and this devitrified layer will preserve the stability of shape of the glass beyond the softening temperature of the original glass, so that it will not melt until substantially higher temperatures are reached. Preferably the upper devitrification limit of the glasses used is to be higher than 800° C.

A great amount of surface devitrification prior to the installation of such window glass is not possible if the complete transparency of the window is to be preserved.

Fire-resistive window glass is to be able to withstand a temperature difference between the middle of the pane and its margin of $\geq 200°$ C. $\leq T_g$ without shattering ($T_g$ = transformation temperature of the glass).

Whereas the fire-resistive pane in the glazing of the invention is intended to provide safety against the passage of fire, the other panes of the glazing serve primarily for protection against noise and heat.

To increase the thermal insulation, the glazing can consist of a plurality of panes spaced from a few millimeters to a few centimeters apart. The more panes the glazing has, the greater will be its thermal insulation. For reasons of cost, however, seldom will more than two to a maximum of three panes be disposed, one in back of the other. To further increase the thermal insulation, one or more panes of the glazing can have infrared-ray reflecting coatings of metal or metal oxide which reflect the thermal radiation such as is produced by the sun.

The acoustical insulation is also improved by an arrangement of several panes, and it can be advantageous to use panes of different thickness. An important improvement of the sound blocking action can be achieved by using, instead of a single thickness of glass, a sandwich consisting of two glass panes with a transparent layer of plastic between them. The glazing of the invention, therefore, also includes a system composed of one fire-resistive glass pane and one glass laminate, one of the two glass panes of the laminate being able again to be a fire-resistive glass pane.

FIGS. 1a, 1b, 2a, and 2b are partial plan views of glazings according to the invention.

FIG. 3 is a fire test curve in accordance with DIN 4102, 1970 Ed., Section 5.2.4, the curve being standard temperature curve I (STCI).

EXAMPLES

A variety of embodiments of the glazing of the invention, each containing at least one fire-resistive pane of glass, are described in the following examples with reference to the appended drawings, these embodiments being adapted, with regard to their other characteristics, to many different applications.

EXAMPLE 1

FIG. 1a represents a transparent, fire-resistive glazing. The glazing contains a fire-resistive glass pane 1 which will not shatter in the event of a fire, and a second glass pane 2 of tempered or untempered structural glass, crystal plate glass or float glass of high thermal expansion $$\alpha (20 - 300) \sim 90 \times 10^{-7} [° C^{-1}].$$

The glass pane 1 consists of a borosilicate glass of the Duran 50 type having a thermal expansion coefficient $\alpha$ (20° − 300° C) of $32 \times 10^{-7} [° C^{-1}]$ and a modulus of elasticity E of $6.3 \times 10^5 [kp \times cm^{-2}]$. The glass pane 1 is under a compressive tension in a marginal area 6 cm wide. Immediately at the outside edge the compressive tension is highest at 600 kp/cm² (determined by optical measurement with polarized light). The compressive tension diminishes uniformly towards the center of the pane, and is zero as measured in a section between the center of the glass and a point 6 cm inside of the edge.

The two glasses are separated by a spacer 3 and are gripped in a steel rim 4. The spacer 3 can be aluminum. Sealing composition 13 secures the panes in the frame 4.

The fire-resistive glass 1 withstands a fire test in accordance with DIN 4102, sheet 2, section 5 (1970 edition) for at least 60 minutes without shattering during the rise in temperature or permitting smoke and fire to pass through it.

The glass 2 will shatter after only 2 to 3 minutes when it is exposed to the fire. If glass 2 is on the side away from the fire, then the greater the distance 5 between the glasses is, the longer it will withstand the fire. If the distance between the glass panes is 12 mm, both the tempered and the untempered crystal plate glass panes will shatter after 4 to 7 minutes. However, if the distance between them is 7 cm, a crystal plate glass that is tempered and located on the side away from the fire will withstand the fire without shattering.

The glazing represented in FIG. 1 does not differ optically from an insulating glazing or double glazing composed of two structural glass sheets. This glazing can be used as insulating glazing in outside windows (in high-rise apartment buildings, for example), or as double glazing in fire-retardant or fire-resistive partitions. This glazing can also be used as door glazing. The distance 5 between the two glasses can, depending on the application, amount to between a few millimeters in the case of insulation glazing in outside windows (e.g., 12 mm), and a few centimeters in the case of partition walls (7 cm, for example).

EXAMPLE 2

A transparent, fire-resistive glazing containing two fire-resistive panes of glass additionally offers improved heat stopping ability in a fire no matter on which side of the glazing the fire breaks out. FIG. 1a is also representative of this embodiment.

Whereas in the case of single glazing a temperature of about 650° C. is reached on the side opposite the fire in a 60 minute fire test (pursuant to DIN 4102), the temperature on the side of a double glazing that is not facing the fire will rise to no more than 450° C., for a spacing of the panes of 12 mm.

Both of the fire-resistive glass panes consist of an aluminosilicate glass having a strong tendency towards surface devitrification and having the following composition in percentages by weight:

SiO₂ 65.80; Al₂O₃ 18.00; Li₂O 4.00; Na₂O 2.00; MgO 1.00; ZnO 6.00; CaO 0.50; BaO 1.50; TiO₂ 0.60; ZrO₂ 0.60.

The glass has the following important physical characteristics:

Thermal expansion coefficient $\alpha$ (20° − 300° C = $50.8 \times 10^{-7} [° C^{-1}]$, Transformation temperature $Tg$ ($\eta \sim 10^{13.5}$) = 600° C., Temperature of the differential thermoanalysis peak = 757° C., Activation energy of the crystal growth rate = 65 [kcal/mol], Upper devitrification limit temperature = 1253 [° C], Elasticity modulus E = 9.2 [kp/mm²].

In addition to the composition of the basic glass, the two fire-resistive panes differ from the fire-resistive glass pane 1 in Example 1 also in the way in which they are after-treated. Both in the marginal area and in the surface layer in the middle of the pane they are under a compressive tension. For this purpose the glass panes are heated to about 800° C. and then the marginal area of the panes is quenched more severely than their center area. A marginal area approximately 5 to 20 mm wide is then under a higher compressive tension than the surface at the middle of the pane.

Since the glass panes consist of a material having a strong tendency towards surface devitrification, a thin, continuous crystalline surface layer forms during a fire, especially on the pane facing the fire, and slowly becomes thicker as the fire continues to burn. Due to the crystalline surface layer that is forming, the glass slowly loses transparency, becoming milky. The crystalline surface layer that is forming prevents any great deformation of the glass pane, so that the closure provided by the window is sustained for at least 90 minutes.

The rim 4 of the glazing consists of steel. Since under the above-described conditions the two fire-resistive glass panes of the glazing withstand the fire for at least 90 minutes, the spacers 3 between the panes are best made of sheet steel or some other material resistant to melting.

EXAMPLE 3

Figure 1B:
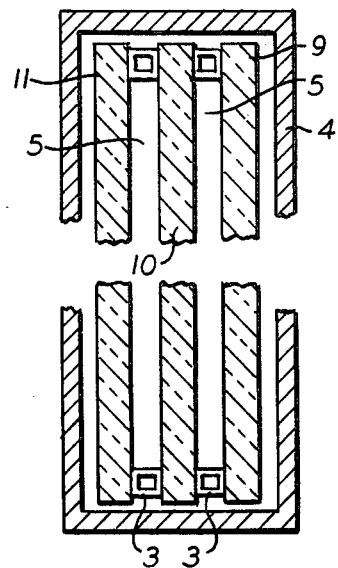

A further improvement of the heat stopping ability in the case of fire can be achieved if the transparent, fire-resistive glazing consists of three glass panes, as in FIG. 1b, wherein there are panes 9, 10, and 11.

If fire can break out on both sides of the glazing, and if the distances 5 between the panes are relatively small (1 to 2 cm), then all three panes are best consist of fire-resistive glass.

If fire can break out on only one side of the glazing, or if the fire stop is needed in one direction only, then even where the distance between the panes is small (1–2 cm), the pane on the side away from the fire can be made of tempered crystal plate glass, since this pane is more slowly heated.

Where the distance between the glass panes is great (5–10 cm), the middle pane can be a tempered crystal plate glass pane, and the pane on the side away from the fire can be made of a non-tempered crystal plate glass.

The fire-resistive glass panes consist of a lithium aluminum silicate glass having a strong tendency towards surface devitrification and having the following composition in percentage by weight:

$SiO_2$ 63.60; $Al_2O_3$ 21.90; $Li_2O$ 3.30; $Na_2O$ 4.10; $MgO$ 1.00; $ZnO$ 2.10; $CaO$ 2.10; $BaO$ 2.10.

The most important physical characteristics are:

$\alpha\ (20 - 300°\ C) = 58.4 \times 10^{-7}\ [°\ C^{-1}]$ $Tg = 612°\ C.$

Position of DTA peak = 769° C.

Upper devitrification limit = 1140° C.

Activation energy of crystal growth rate = 65 kcal/mole

The marginal area of the fire-resistive panes is placed under compressive tension by surface devitrification, and the middle of the panes by rapid quenching. For this purpose the pane is heated to 610° C. and laid between two asbestos boards, so that a 2 cm wide margin of the pane is left exposed on all sides, and the entire sandwich is transferred to a second oven heated at 870° C. The pane is left at this temperature for 10 minutes to produce the surface devitrification, which creates a crystalline surface layer about 100 micrometers thick in the marginal area. Then the pane is gripped by its surface-devitrified margin and the two asbestos boards are removed. After the middle of the glass has also been exposed for a few seconds to the 870° C. temperature, the entire pane is taken from the second oven and placed in an air blast tunnel. As the glass cools, a compressive tension is produced both in the margin (due to the surface devitrification) and in the middle of the pane (due to the quenching), the compressive tension in the margin of the glass being considerably greater than that in the middle thereof.

In the case of a glazing comprised of three fire-resistive panes, the high heat stopping ability of the two outer panes allows the pane exposed to the fire to reach nearly the oven chamber temperature. The inner glass pane would melt after a period of no more than 60 minutes if a devitrified surface layer would not form during the exposure to heat due to the strong tendency of the glass towards surface devitrification. Even a devitrified layer 5 to 10 $\mu$m thick suffices to reduce the deformation of a glass pane heated to the softening temperature. The glazing will resist the fire for at least 90 minutes, during which time at least one of the panes will still be not so greatly deformed that the integrity of the closure will be lost.

The rim 4 and the spacers 3 of the glazing can again be of steel.

EXAMPLE 4

A glazing that is transparent, fire-resistive, and provides great heat stopping ability at room temperature can be of the same construction as described in Example 1. However, at least one of the two glass panes contains a coating which reflects infrared radiation or consists of an infrared absorbing glass.

The rim 4, the spacer 3 and the distance 5 between the two panes can, again, be as described in Example 1.

The fire-resistive glass pane consists of the same glass as the pane 1 in Example 1, but it differs from the latter in that not only its marginal area but also the surface layer in the middle of the pane is under compressive tension, the compressive tension in the middle being lower than it is in the marginal area. The increased compressive tension in the marginal area of the pane can be achieved, for example, by air-quenching the pane, after heating it to 720° C., more strongly in the marginal area than in the middle of the pane. The zone of increased compressive tension in the marginal area can be 5 to 20 mm wide, for example.

The non-fire-resistive glass pane can consist either of a structural glass pane provided with a coating which strongly reflects infrared radiation, or of a tinted structural glass which absorbs infrared radiation. The infrared ray reflecting coatings have the object of reflecting solar radiation and the thermal radiation that occurs. For this purpose, coatings of metal, such as gold, or coatings of metal oxide such as titanium oxide, for example, are commonly applied to the glass pane.

Since the infrared ray reflecting coatings can also be applied to the fire-resistive glass, a glazing can also be prepared having two infrared ray reflecting glass panes. Thus in FIG. 1a, panes 1 and 2 can, respectively, have coatings 11 and 12.

The high heat absorption of tinted structural glass panes can be achieved by the addition of iron and titanium to the glass composition. The same heat absorption can also be obtained in the glass pane that is fire-resistive if iron and titanium are added to its composition as well.

EXAMPLE 5

FIG. 2 shows two fire-resistive glazings containing a laminated pane.

Figure 2A:
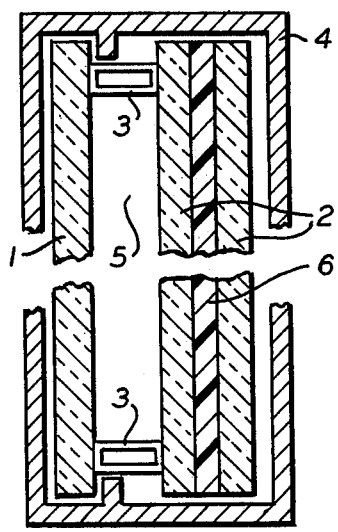

FIG. 2a represents a glazing which is fire-resistive and has a high soundproofing ability. The high soundproofing ability is achieved not only by means of the fire-resistive pane 1 but also, and primarily, by means of the thicker, laminated pane composed of two sheets of crystal plate glass with a transparent plastic layer 6 between them, made, for example, of epoxy glass, which is known, and having a high mechanical damping characteristic.

Figure 2B:
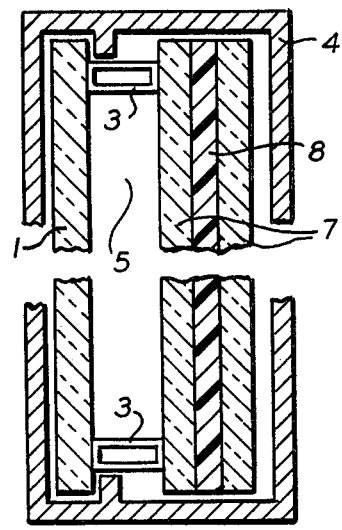

In FIG. 2b there is shown a fire-resistive glazing containing a laminated safety glass pane. The laminated safety glass consists of two sheets of crystal plate glass 7 which are toughened on both sides, with a transparent plastic sheet 8 between them, made, for example, of polyvinyl butyral, which is known.

In both glazings the steel rim 4 is so constructed that the fire-resistive glass pane will remain firmly seated in the rim in the event of a fire, even if the laminate shatters and drops out of the rim. The spacers 3 can, again, consist of aluminum.

As it appears from the foregoing examples, other combinations of glass panes can be used in accordance with the invention.

Herein, the "thermal expansion coefficient is α (20°-300° C.).

What is claimed is:

1. A window comprising a frame and two or more panes which are mounted in the frame and disposed therein in substantially parallel relation, substantially filling the frame opening, at least one of the panes being composed of fire resistant glass which is a borosilicate or aluminosilicate glass and will withstand heating in accordance with DIN 4102, 1970 Edition, Section 5.2.4, standard temperature curve 1 as shown in FIG. 3 of the drawings, for at least 30 minutes, and has a product of thermal expansion coefficient α and elasticity modulus E of 1 to 5 kp × cm$^{-2}$ × ° C$^{-1}$, and has a compressive prestress in the peripheral edge portion thereof.

2. Window of claim 1, wherein the fire resistant glass pane has a strong tendency towards surface devitrification such that it will form a devitrified layer over its entire surface while it is being heated to its softening temperature, and this devitrified layer will preserve the stability of shape of the glass beyond the softening temperature of the original glass, and will not melt until substantially higher temperatures are reached.

3. Window of claim 2, wherein the fire resistant glass pane has in the peripheral edge portion thereof a crystalline surface layer of lower thermal expansion than the basic glass.

4. Window of claim 3, wherein the glass having a strong tendency towards surface devitrification has an upper devitrification limit of over 800° C.

5. Window of claim 1, wherein the panes are spaced apart a distance of 10 mm to 100 mm apart.

6. Window of claim 1, at least one of said glass panes other than said fire resistant pane being of structural glass, crystal plate glass or float glass.

7. Window of claim 6, the pane of structural glass, crystal plate glass or float glass being under compressive tension on all sides, or having a compressive prestress in the peripheral edge portion thereof.

8. Window of claim 1, having at least two of said fire resistant glass panes.

9. Window of claim 1, at least one of said glass panes being a laminate composed of a plurality of glass panes.

10. Glazing of claim 9, said laminate being a laminate of a plastic pane and two glass panes, one of the laminate glass panes being disposed on each face of the plastic pane.

11. Window of claim 1, wherein one of the panes has a film deposited on one of the face surfaces thereof which reflects infrared radiation occurring at normal temperature (10° to 150° C.).

12. Window of claim 1, the panes being transparent.

13. Window of claim 1, wherein said fire-resistant pane does not shatter when exposed to fire.

14. Window of claim 1, wherein one or both of the surface layers of the fire-resistant glass pane disposed inwardly of the marginal zone has a compressive prestress.

15. Window of claim 1, wherein the compressive prestress is produced by quenching.

16. Window of claim 1, wherein the fire resitant glass pane has a strong tendency towards surface devitrification such that it will form a devitrified layer over its entire surface while it is being heated to its softening temperature, and this devitrified layer will preserve the stability of shape of the glass beyond the softening temperature of the original glass, and will not melt until substantially higher temperatures are reached, and has in the peripheral edge portion thereof crystalline surface layer of lower thermal expansion than the basic glass, and has an upper devitrification limit of over 800° C., and does not shatter when exposed to fire, and wherein one or both of the surface layers of the fire resistant glass pane disposed inwardly of the marginal zone has a compressive prestress, said panes being transparent.

17. Window of claim 16, wherein the compressive prestress of said surface layer(s) is produced by quenching.

18. Window of claim 14, wherein the compressive stresses in the edge portion and in said surface layer(s) are produced by quenching.

19. Window according to claim 14, wherein the compressive stress in the edge portion is higher than the compressive stress in said surface layer(s).

20. A window comprising a frame and two or more panes which are mounted in the frame and disposed therein in substantially parallel relation, substantially filling the frame opening, at least one of the panes being composed of fire resistant glass which will withstand heating in accordance with DIN 4102, 1970 Edition, Section 5.2.4, standard temperature curve 1 as shown in FIG. 3 of the drawings, for at least 30 minutes, and has a product of thermal expansion α and elasticity modulus E of 1 to 5 kp × cm$^{-2}$ × ° C$^{-1}$, and which has a compressive prestress in the peripheral edge portion thereof.

21. Window of claim 20, said panes being transparent.

22. Window of claim 20, wherein said fire-resistant pane does not shatter when exposed to fire.

23. Window of claim 20, wherein one or both of the surface layers of the fire-resistant glass disposed inwardly of the marginal zone has a compressive prestress.

24. Window of claim 20, wherein the compressive prestress is produced by quenching.

25. Window of claim 20, said panes being transparent, and wherein said fire resistant pane does not shatter when exposed to fire, and wherein one or both of the surface layers of the fire-resistant glass disposed inwardly of the marginal zone has a compressive prestress.

26. Window of claim 25, wherein the compressive prestress of said surface layer(s) is produced by quenching.

27. Window of claim 20, wherein the fire resistant glass pane has a strong tendency towards surface devitrification such that it will form a devitrified layer over its entire surface while it is being heated to its softening temperature, and this devitrified layer will preserve the stability of shape of the glass beyond the softening temperature of the original glass, and will not melt until substantially higher temperatures are reached.

28. Window of claim 23, wherein the compressive stresses in the edge portion and in said surface layer(s) are produced by quenching.

29. Window according to claim 23, wherein the compressive stress in the edge portion is higher than the compressive stress in said surface layer(s).

* * * * *